(12) United States Patent
Muniere et al.

(10) Patent No.: US 7,440,744 B2
(45) Date of Patent: Oct. 21, 2008

(54) METHOD OF CONTROLLING MULTIMEDIA CALL SESSIONS IN A CELLULAR MOBILE RADIO SYSTEM

(75) Inventors: Vincent Muniere, Paris (FR); Bruno Landais, Pleumeur-Bodou (FR)

(73) Assignee: Evolium S.A.S., Paris (FR)

( * ) Notice: Subject to any disclaimer, the term of this patent is extended or adjusted under 35 U.S.C. 154(b) by 611 days.

(21) Appl. No.: 10/097,974

(22) Filed: Mar. 15, 2002

(65) Prior Publication Data

US 2002/0142749 A1 Oct. 3, 2002

(30) Foreign Application Priority Data

Mar. 16, 2001 (FR) .................................... 01 03638

(51) Int. Cl.
*H04Q 7/20* (2006.01)
(52) U.S. Cl. ................. 455/403; 455/414.1; 455/414.2; 455/426.1; 455/426.2; 455/453; 370/310; 370/328; 370/329
(58) Field of Classification Search ................. 455/466, 455/414.1, 414.2, 403, 414.4, 517, 422.1, 455/426.1, 426.2, 500, 451, 452, 453, 454, 455/509, 501, 550.1, 513, 514, 515; 379/229; 370/354, 328, 329, 338, 310, 343
See application file for complete search history.

(56) References Cited

U.S. PATENT DOCUMENTS

| | | | | |
|---|---|---|---|---|
| 6,097,733 A * | 8/2000 | Basu et al. | ................... | 370/468 |
| 6,798,786 B1 * | 9/2004 | Lo et al. | ...................... | 370/468 |
| 2002/0093948 A1 * | 7/2002 | Dertz et al. | .................. | 370/355 |
| 2004/0002325 A1 * | 1/2004 | Evans et al. | .............. | 455/414.1 |
| 2004/0028037 A1 * | 2/2004 | Rananen et al. | ............. | 370/354 |
| 2004/0101125 A1 * | 5/2004 | Graf et al. | .................... | 379/229 |

FOREIGN PATENT DOCUMENTS

| WO | WO 98/32265 A1 | 7/1998 |
|---|---|---|
| WO | WO 00/54522 A2 | 9/2000 |
| WO | WO 00/72525 A1 | 11/2000 |
| WO | WO 01/50782 A2 | 7/2001 |

* cited by examiner

*Primary Examiner*—Keith T Ferguson
(74) *Attorney, Agent, or Firm*—Sughrue Mion, PLLC

(57) ABSTRACT

A multimedia call session control method for use in a cellular mobile radio system, the method including: performing a negotiation operation for determining the characteristics of the components of the session, and allocating resources based on characteristics determined in the negotiation step, wherein the negotiation step includes informing at least one of the parties to the call is informed of the capacities of its server radio access network, at least in its server cell, and taking into account the capacities of the server radio access network in the negotiation, in order to be able to allocate corresponding resources.

19 Claims, 3 Drawing Sheets

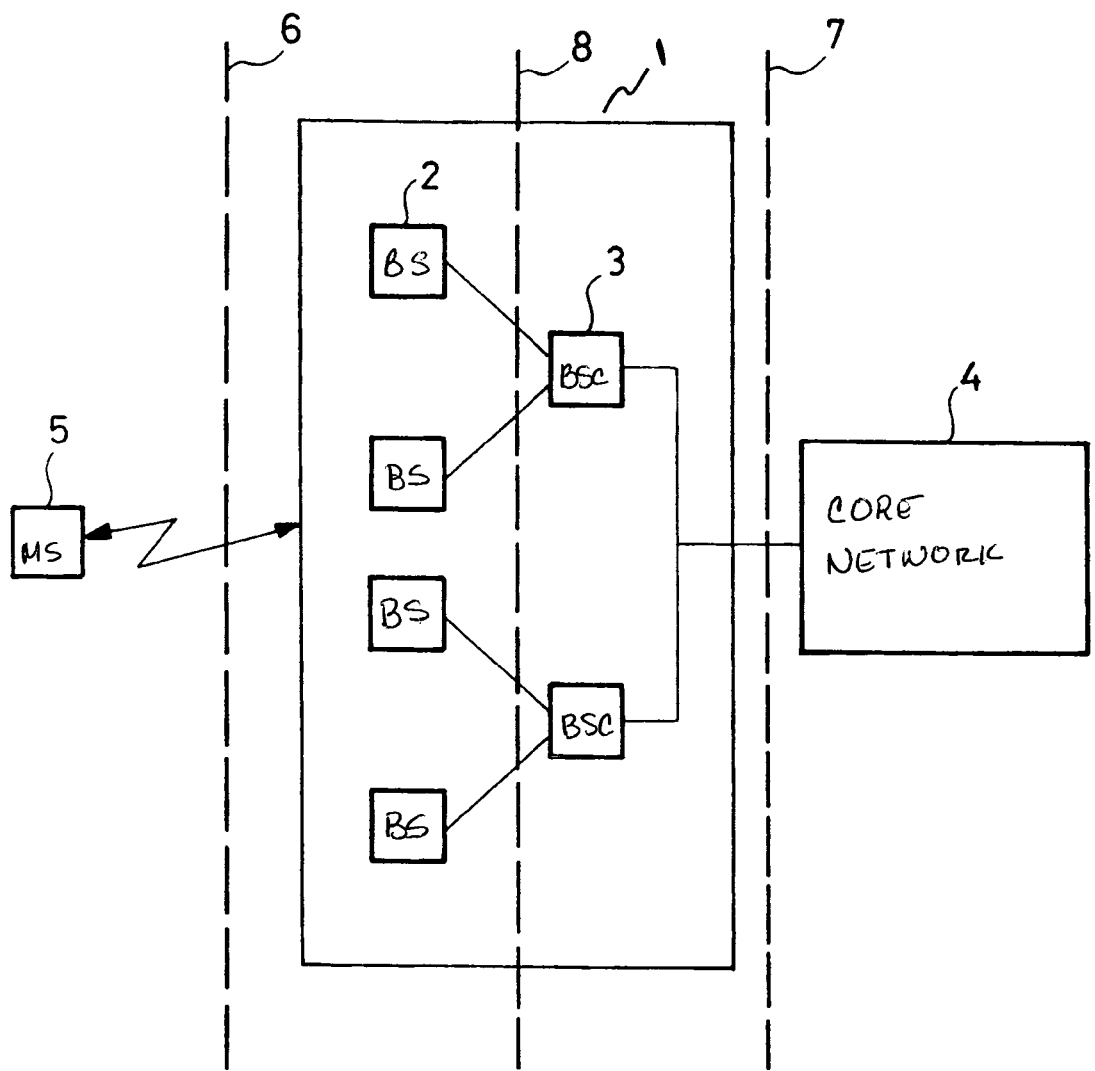
FIG_1

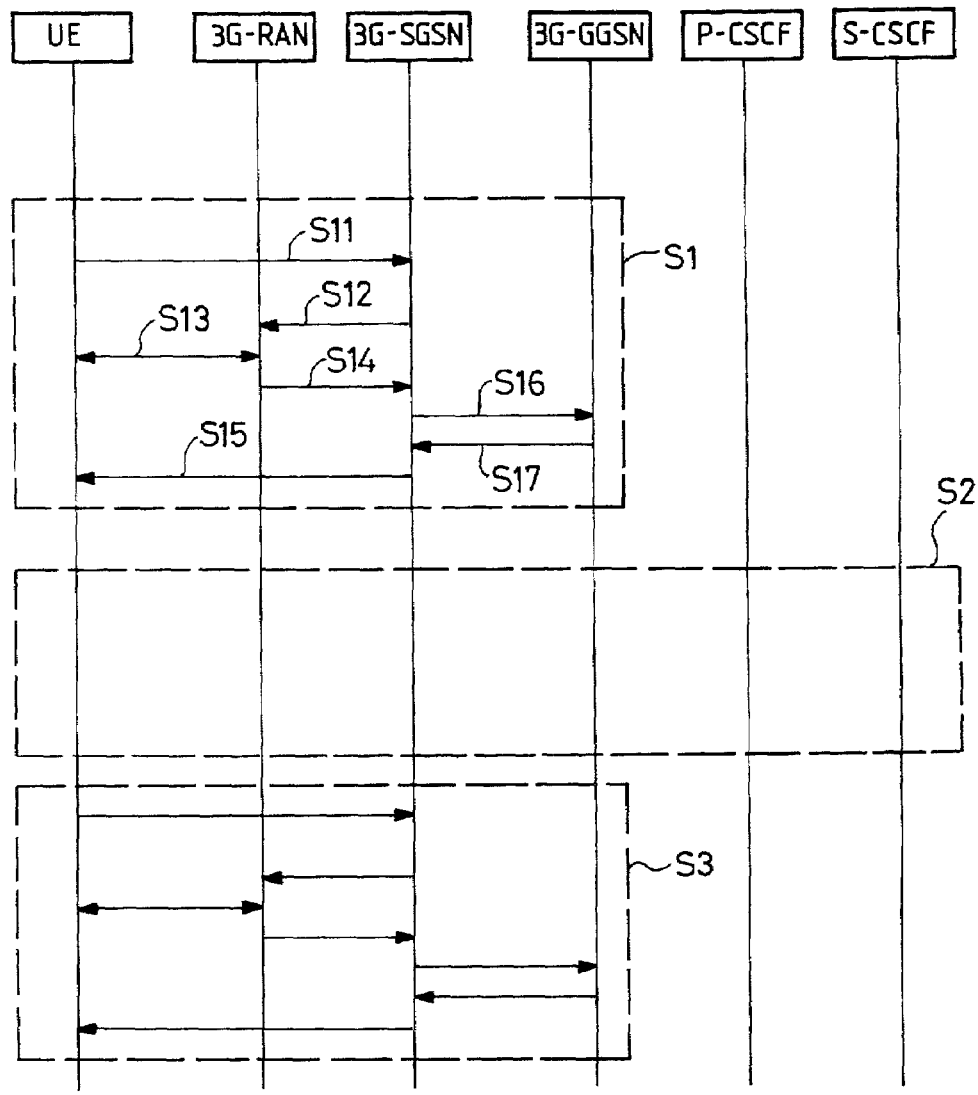

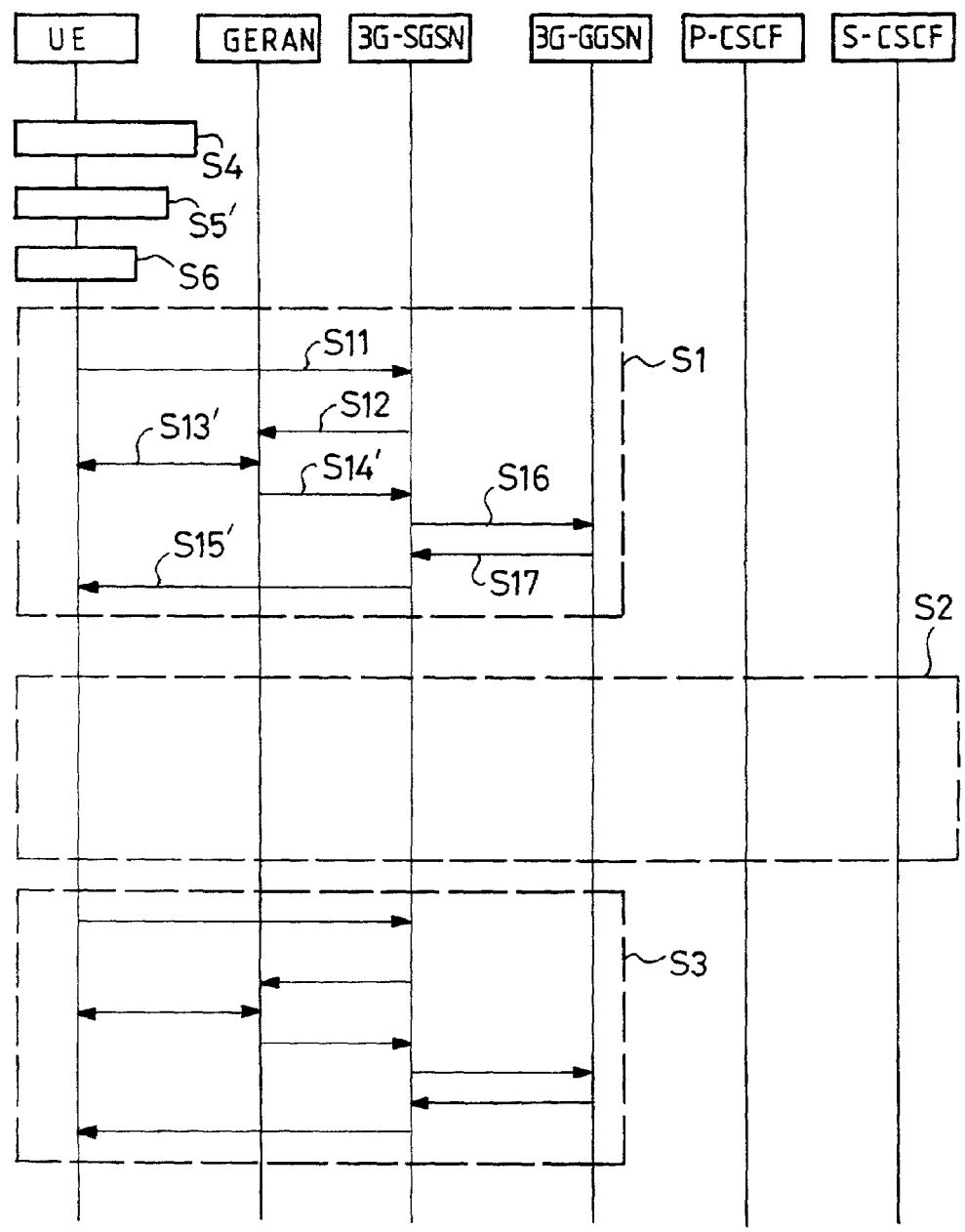
FIG_3

METHOD OF CONTROLLING MULTIMEDIA CALL SESSIONS IN A CELLULAR MOBILE RADIO SYSTEM

BACKGROUND OF THE INVENTION

The present invention relates generally to mobile radio systems.

FIG. 1 outlines the architecture of mobile radio systems. As a general rule, a mobile radio system essentially comprises:
- a radio access network (RAN) 1 comprising base stations 2 and base station controllers 3, and
- a core network (CN) 4.

The radio access network 1 is connected to mobile stations 5 via an interface 6 which is called the radio interface and to the core network via an interface 7. Within the radio access network, the base stations communicate with the base station controllers via an interface 8.

The core network 4 is connected both to the radio access network via the interface 7 and to external networks, not specifically shown.

In these systems, technological changes are making it necessary to draw a distinction between second generation (2G) technologies, in particular Global System for Mobile communication (GSM) technologies, and third generation (3G) technologies, in particular Universal Mobile Telecommunication System (UMTS) technologies.

In the GSM, the radio access network is called the Base Station Subsystem (BSS), a base station is called a Base Transceiver Station (BTS), and the core network is called the Network Sub-System (NSS). The NSS essentially contains entities (network nodes) such as the Mobile-services Switching Center (MSC). The radio interface is called the Um interface, the interface 7 is called the A interface, and the interface 8 is called the Abis interface.

As a general rule, these systems are covered by standards, and for more information reference may be had to the corresponding standards published by the corresponding standards organizations.

The GSM standards have evolved recently with the introduction of the General Packet Radio Service (GPRS) offering services in packet-switched mode and then the Enhanced Data rates for GSM Evolution (EDGE) offering higher bit rates at the radio interface and divided into two improvements: the first, known as Enhanced Circuit Switched Data (ECSD), increases the bit rates in circuit-switched mode and the second, known as Enhanced GPRS (EGPRS), increases the bit rates in packet-switched mode.

In the GPRS and EGPRS, the interface 7 is called the Gb interface and the core network essentially contains entities (network nodes) such as Serving GPRS Support Node (SGSN) and Gateway GPRS Support Node (GGSN) entities, the latter in turn communicating with packet-switched mode external networks, in particular Internet Protocol (IP) networks.

A radio access network using the GSM/EDGE radio access technologies is called a GSM/EDGE Radio Access Network (GERAN).

In the UMTS, the radio access network is called the UMTS Terrestrial Radio Access Network (UTRAN), a base station is called a Node B, a base station controller is called a Radio Network Controller (RNC), and a mobile station is called a User Equipment (UE). The radio interface is called the Uu interface, the interface 7 is called the Iu interface, the interface 8 is called the Iub interface, and an interface between RNC is introduced, and is called the Iur interface. The Iu interface is itself made up of two interfaces, of which one is called the Iu-cs interface (where "cs" denotes "circuit-switched") and the other is called the Iu-ps interface (where "ps" denotes "packet-switched").

In the UMTS, the core network essentially contains 3G-MSC, 3G-SGSN, and 3G-GGSN entities (network nodes) (the MSC, SGSN, and GGSN entities of the 2G systems previously mentioned are respectively called the 2G-MSC, the 2G-SGSN, and the 2G-GGSN entities). The Iu-cs interface connects the UTRAN to the 3G-MSC and the Iu-ps interface connects the UTRAN to the 3G-SGSN.

The UMTS access network differs from the GSM, GPRS and EDGE access network essentially because of the introduction of higher performance radio access technologies, based in particular on using the Wideband-Code Division Multiple Access (W-CDMA) technique. The core network of the UMTS offers multimedia services at high bit rates.

As a general rule, the UMTS is also covered by standards, and for more information reference may be had to the corresponding standards, published by the corresponding standards organizations.

A GSM general packet radio service as described above operates in a mode called the A/Gb mode.

With the aim of harmonizing the services offered via the UMTS and the GSM/EDGE radio access technologies, a new mode of connecting a GERAN directly to 3G-MSC or 3G-SGSN core network nodes has been introduced, and is called the Iu mode.

In the Iu mode, real time services will initially be offered via the Iu-cs interface, which connects a GERAN to a 3G-MSC. In this initial stage, the Iu-ps interface, which connects a GERAN to a 3G-SGSN, will provide only non-real-time services. Subsequently, real-time services will also be supported at the Iu-ps interface.

A new network core interface has therefore been defined, so that real-time services and non-real-time services can be offered by a packet-oriented interface such as the Iu-ps interface. One such architecture is the IP Multimedia Sub-System (IM SS) architecture. Multimedia services can then be offered via a single reference point with signaling relating to call session control transported via a Session Initiation Protocol (SIP).

Signaling relating to multimedia call session control has until now been defined for UMTS technologies. Thus the signaling typically includes setting up an RRC connection between a mobile station and an RAN, followed by setting up a UMTS bearer to transport the signaling relating to the SIP protocol. The Radio Resource Control (RRC) protocol is defined in the 3G TS 25.33 standard. The SIP and the associated Session Description Protocol (SDP) are defined by the Internet Engineering Task Force (IETF), which is the Internet Protocol (IP) standards organization.

FIG. 2 shows the main steps of this kind of signaling. For simplicity, FIG. 2 shows only one of three segments into which call session control is divided, in this instance the segment from the calling UE to its S-CSCF (Serving-Call Session Control Function); the other two segments are the segment from the called UE to its S-CSCF and the segment which connects the S-CSCF of the calling UE and the called UE. The S-CSCF and Proxy-Call Session Control Function (P-CSCF) entities are core network entities responsible for multimedia call session control.

Note that throughout the description the term UE is used by way of example, and it must be understood that it can refer to any mobile station (UMTS and/or GERAN).

Step S1 is essentially a preliminary step preceding session set-up.

Step S1 uses a packet-switched mode data protocol (Packet Data Protocol (PDP)) context activation procedure, which is necessary for transporting multimedia session control signaling. A PDP context includes a set of UMTS bearer parameters, including Quality of Service (QoS) parameters, etc. This step is followed by another PDP context activation procedure, necessary for transporting data associated with the multimedia session itself. Because these two PDP contexts concern the same IP address, step S1 is called the primary PDP context activation procedure.

Step S1 essentially comprises the following steps. In a step S1, a PDP context activation request is sent from the UE to the RAN, with the corresponding end-to-end QoS quality parameters for the SIP level signaling UMTS bearer. In a step S12, the 3G-SGSN commands the setting up of a Radio Access Bearer (RAB) so that a medium complying with the applicable quality of service constraints is available between the UE and the 3G-SGSN. When the RAN receives this kind of request, after call admission control, it sets up a Radio Bearer (RB) at the radio interface (step S13) and an Iu bearer at the Iu interface. RAB set-up can then be confirmed (step S14) and the PDP context activated (S15), after negotiation with the 3G-GGSN (steps S16, S17).

Step S2 essentially sets up the multimedia session at the SIP level. This step includes negotiation to determine the characteristics for the session being set up. The negotiation includes negotiation of codecs, for the purpose of determining, for the session concerned, a list or set of codecs which can be supported in common by the two parties to a call and authorized for all the intermediate network nodes.

The codecs determine, both in the mobile stations and in the radio access network (in particular in the base stations) and in the core network, how to perform the necessary source coding and channel coding, in particular for transmission at the radio interface. For example, in the GSM, there are different types of codecs for speech coding: Full Rate (FR), Enhanced Full Rate (EFR), Half Rate (HR), and Adaptive Multi-Rate (AMR) codecs, the latter being particularly beneficial in that AMR coding optimizes the quality of service (in this instance by selecting an instantaneous optimum combination of a given source code and a given channel code, as a function of the transmission conditions encountered). There are two types of AMR codecs: narrowband AMR codecs, and wideband AMR codecs. A wideband AMR codec offers a better quality of service but necessitates higher radio bit rates. Speech is, of course, merely one example of the different components or media streams forming a multimedia session.

Step S2 is not shown in detail in FIG. 2, but more information can be obtained by referring to the 3G TS 23.228 standard. Step S2 essentially comprises the following steps. Once an RB has been set up for SIP signaling (in the preceding step S1), a first task is for the SIP client to discover its P-CSCF. It must then declare itself and register with its S-CSCF, which will call on other entities of the core network. Finally, at the time of session set-up, a "SIP Invite" request is sent to the called party via the P-CSCF and S-CSCF entities. This message contains an SDP Datagram which indicates, for each media stream, that the calling UE wishes to set a number of media parameters, such as: media type, QoS attribute combination, list of codecs that can be supported for this session, etc. The P-CSCF and S-CSCF entities associated with the calling party and then with the called party then perform a service check on these parameters (against criteria specific to the network). The called party then determines, amongst other things, its own list of codecs that can be supported for the session, and then a list of codecs than can be supported in common by the two parties (calling party and called party), and then returns the latter list to the calling party. The calling party then determines which media streams must be used for the session and which codecs in the list must be used for the session.

Step S3 is essentially an end of session set-up step and includes a resource allocation step based on media stream characteristics determined in step S2 (QoS attributes, negotiated codecs, etc.).

Step S3 also uses a PDP context activation procedure, which is called a secondary PDP context activation procedure to distinguish it from the primary context activation procedure of step S1. Step S3 is similar to step S1, except that the parameters for the UMTS bearer to be set up now correspond to the requirements determined in S2. Step S3 itself includes steps similar to those of step S1, and which are not described again for this reason.

Step S3 thus includes the setting up of an RAB for the secondary PDP context. When the RAB has been set up, the RAN performs an admission check and accepts or rejects the call.

In the case of the UTRAN, the RAB request must be accepted because all types of codecs (modes) must be supported by the Node B, or more generally by the RNS that contains the Node B (the RNS being a sub-network within the UTRAN, formed of an RNC and one or more Node B controlled by that RNC). The only situation in which this kind of request would be rejected is one of congestion (in which case no resource is available).

In the case of the GERAN in particular, a problem arises because not all BTS can support all types of codecs. For example, in the case of media streams consisting of speech, not all BTS can support Wideband AMR codecs. Thus if two SIP clients are negotiating a codec for a given media stream, but that codec is not supported by the BTS (or more generally by the BSS that contains the BTS), activation of the PDP protocol context will fail. This will necessitate SIP re-negotiation, which delays the setting up of the call, which can be unacceptable.

One solution would be to interchange the SIP negotiation and secondary PDP protocol context activation procedures. However, this solution cannot be used because it is not compatible with the standard.

BRIEF SUMMARY OF THE INVENTION

An object of the present invention is to avoid these various problems.

One aspect of the present invention therefore provides a multimedia call session control method for use in a cellular mobile radio system, said method including:

a negotiation step for determining the characteristics of the components of said session, and a step for allocating resources based on characteristics determined in the negotiation step, which method is essentially characterized in that the negotiation step includes the following steps:

at least one of the parties to the call is informed of the capacities of its server radio access network, at least in its server cell, and the capacities of said server radio access network are taken into account in said negotiation, in order to be able to allocate corresponding resources.

According to another feature of the invention said negotiation step includes a step of determining for said session parameters of media which can be supported in common by each of the parties to the call.

According to another feature of the invention said negotiation step includes a step of determining for said session, from a list of codecs which can be supported separately by each of the parties to the call, a list of codecs which can be supported in common by each of the parties to the call.

According to another feature of the invention each of the parties to the call or one of the parties to the call takes account of its own capacities and said capacities of the server radio access network to determine for said session a list of codecs that it can support.

According to another feature of the invention said information on the capacities of the server radio access network is transmitted on a broadcast channel.

According to another feature of the invention said broadcast channel is a GERAN Broadcast Control Channel (BCCH) or Packet Broadcast Control Channel (PBCCH); said broadcast channel is a UTRAN Broadcast Channel (BCH).

According to another feature of the invention said information on the capacities of the server radio access network is transmitted on a common control channel.

According to another feature of the invention said common control channel is a GERAN Packet Control Common Channel (PCCCH); said common control channel is a UTRAN paging Channel (PCH) or Forward Access Channel (FACH).

According to another feature of the invention said information on the capacities of the server radio access network is transmitted in a dedicated signaling message.

According to another feature of the invention said dedicated signaling message is any downlink Radio Resource Control (RRC) protocol message. The RRC protocol is defined in the 3G TS 25.331 standard (UTRAN) and in the 3G TS 44.018 standard (GERAN). For example, the following messages can be used: a "RRC CONNECTION SETUP" message, a "RADIO BEARER SETUP" message, a "DOWNLINK DIRECT TRANSFER" message, a "RADIO BEARER RECONFIGURATION" message, a "CELL UPDATE CONFIRM/URA UPDATE CONFIRM" message, a "HANDOVER COMMAND" message.

The present invention also provides a mobile radio system including means for implementing the above method.

The present invention also provides a mobile radio network equipment including means for implementing the above method.

The present invention also provides a mobile station including means for implementing the above method.

BRIEF DESCRIPTION OF THE DRAWINGS

Other objects and features of the present invention will become apparent after reading the following description of one embodiment of the invention, which is given with reference to the accompanying drawings, in which:

FIG. 1 is a diagram of the general architecture of a mobile radio system,

FIG. 2 is a diagram of a prior art multimedia call session control method, and

FIG. 3 is a diagram of a multimedia call session control method according to the invention.

DETAILED DESCRIPTION OF THE INVENTION

The present invention therefore provides a multimedia call session control method for use in a cellular mobile radio system, said method including:
 a negotiation step for determining the characteristics of the components of said session, and
 a step for allocating resources based on characteristics determined in the negotiation step.

According to the invention, the negotiation step essentially includes the following steps:
 at least one of the parties to the call is informed of the capacities of its server radio access network, at least in its server cell, and
 the capacities of said server radio access network are taken into account in said negotiation, in order to be able to allocate corresponding resources.

In particular, said negotiation step includes a step of determining for said session parameters of media which can be supported in common by each of the parties to the call.

In particular, said negotiation step includes a step of determining for said session, from a list of codecs which can be supported separately by each of the parties to the call, a list of codecs which can be supported in common by each of the parties to the call.

In particular, each of the parties to the call or one of the parties to the call takes account of its own capacities and said capacities of the server radio access network to determine for said session a list of codecs that it can support.

Embodiments of the invention are described next by way of example. They are shown in FIG. 3, which repeats the steps of FIG. 2, indicating only the modifications relative to that figure, in this instance by indicating with the symbol ' steps that could be relevant to the various embodiments of the invention.

FIG. 3 further shows an initial step S4 in which the UE is in idle mode and is effecting the usual tasks of reading system information broadcast on broadcast channels (such as a Broadcast Control Channel (BCCH), a Packet Broadcast Control Channel (PBCCH), or a Broadcast Channel (BCH)), selecting a server Public Land Mobile Network (PLMN), selecting a server cell, etc.

In step S5 the UE switches to a connected RRC mode, which corresponds to setting up an RRC connection.

Step 6 corresponds to a "GPRS Attach" procedure, as defined in the 3G TS 24.008 standard.

In one embodiment of the invention, the information on the capacities of the server radio access network is transmitted on a broadcast channel.

For example, in the GSM, this information can be transmitted on the Broadcast Control Channel (BCCH) or on the Packet Broadcast Control Channel (PBCCH). Since, before sending or receiving a call, the mobile station must read information received on this kind of channel (this being part of the procedure executed by the mobile station in step S4), the capacities of the radio access network can be taken into account in the SIP negotiation.

In a different embodiment, the information on the capacities of the server radio access network is transmitted on a common control channel.

For example, in the GSM, this information can be transmitted on the Packet Common Control Channel (PCCCH). The PCCCH has a distribution part at the start of each message than can be used to transmit said information.

In a different embodiment of the invention, the information on the capacities of the server radio access network is transmitted in a dedicated signaling message.

Various examples are described next of transmitting the aforementioned information in a dedicated signaling message; these examples are obviously not limiting on the invention. Any RRC message sent on the downlink can be used, among other things, to transmit this information.

In one example, the dedicated signaling message is an "RRC CONNECTION SETUP" message received from the GERAN when an RRC connection is set up. An RRC connection must be set up (step S5') before executing a "GPRS Attach" procedure (step S6) or sending a PDP context activation request to the SGSN to activate the primary PDP context.

In another example, the dedicated signaling message is a "RADIO BEARER SETUP" message received from the GERAN when a radio bearer (RB) is set up (S13'). An RB must be set up in advance of SIP signaling.

In another example, the dedicated signaling message is a "DOWNLINK DIRECT TRANSFER" message received from the GERAN and transmitted at the time of primary PDP context activation (step S15'). This message is therefore also received prior to SIP signaling.

In another example, the dedicated signaling message is a "RADIO BEARER RECONFIGURATION" message which can be used in particular to indicate a change in the capacities of the server radio access network and/or a change in the radio bearer or bearers RB set up for the component or components of the multimedia session.

In another example, the dedicated signaling message is a "CELL UPDATE CONFIRM/URA UPDATE CONFIRM" message, which could be used in particular if a user changes his server cell, although an RRC connection exists, but has not been allocated a dedicated channel. In this case, SIP renegotiation may be triggered, followed by secondary PDP context modification involving RB reconfiguration, although this does not occur systematically.

In another example, the dedicated signaling message is a "HANDOVER COMMAND" message, which could be used in particular when a user changes his server cell, although he has been allocated a dedicated channel. In this case, if the codec that was used in the old cell is no longer supported by the new cell, SIP level codec renegotiation can be triggered, possibly followed by secondary PDP context modification, implying RB reconfiguration.

The information on the capacities of the server radio access network can be considered to constitute an Information Element (IE) in the sense of the RRC protocol, for example. This information element would then be indicated in the RRC message concerned. This information element could be called a "GERAN Information Element", for example, and the information indicated could then be called the "Supported Codecs" information, for example.

The information on the capacities of the server radio access network could furthermore concern not only the server cell but also adjoining cells.

Furthermore, the invention does not apply only to the particular media parameter that the list of codecs supported constitutes, but applies to any type of parameter.

Moreover, although described more particularly hereinabove in the context of application to the GERAN, the invention can be applied to any network, including UMTS networks.

The present invention also provides, in addition to the above method, a cellular mobile radio system, a cellular mobile radio network, a cellular mobile radio network equipment and a mobile station, all including means for implementing the method.

The particular implementation of such means representing no particular problem for the person skilled in the art, they do not need to be described here in more detail than by stating their function, as above.

The invention claimed is:

1. A multimedia call session control method for use in a cellular mobile radio system, said method comprising:

performing a negotiation operation for determining characteristics of components of a multimedia call session, and allocating resources based on the characteristics determined by performing the negotiation operation;

wherein the negotiation operation comprises:

informing at least one of the parties to the call of capacities of its server radio access network, at least in its server cell, and taking into account the capacities of said server radio access network in said negotiation, in order to be able to allocate corresponding resources, so as to avoid re-performing the negotiation operation if the allocating of the resources fails due to lack of capacities of said server radio access network.

2. A method according to claim 1, wherein said negotiation operation further comprises determining for said session parameters of media which can be supported in common by each of the parties to the call.

3. A method according to claim 1, wherein said negotiation operation includes determining for said session, from a list of codecs which can be supported separately by each of the parties to the call, a list of codecs which can be supported in common by each of the parties to the call.

4. A method according to claim 1, wherein each of the parties to the call or one of the parties to the call takes account of its own capacities and said capacities of the server radio access network to determine for said session a list of codecs that it can support.

5. A method according to claim 1, wherein said information on the capacities of the server radio access network is transmitted on a broadcast channel.

6. A method according to claim 5, wherein said broadcast channel is a GSM/GPRS Broadcast Control Channel (BCCH) or Packet Broadcast Control Channel (PBCCH).

7. A method according to claim 5, wherein said broadcast channel is a UMTS Broadcast Channel (BCH).

8. A method according to claim 1, wherein said information on the capacities of the server radio access network is transmitted on a common control channel.

9. A method according to claim 8, wherein said common control channel is a GSM/GPRS Packet Common Control Channel (PCCCH).

10. A method according to claim 1, wherein said information on the capacities of the server radio access network is transmitted in a dedicated signaling message.

11. A method according to claim 10, wherein said dedicated signaling message is a "RRC CONNECTION SETUP" message defined in accordance with a Radio Resource Control (RRC) protocol.

12. A method according to claim 10, wherein said dedicated signaling message is a "RADIO BEARER SETUP" message defined in accordance with a Radio Resource Control (RRC) protocol.

13. A method according to claim 10, wherein said dedicated signaling message is a "DOWNLINK DIRECT TRANSFER" message defined in accordance with a Radio Resource Control (RRC) protocol.

14. A method according to claim 10, wherein said dedicated signaling message is a "RADIO BEARER RECONFIGURATION" message defined in accordance with a Radio Resource Control (RRC) protocol.

15. A method according to claim 10, wherein said dedicated signaling message is a "CELL UPDATE CONFIRM/URA UPDATE CONFIRM" message defined in accordance with a Radio Resource Control (RRC) protocol.

16. A method according to claim 10, wherein said dedicated signaling message is a "HANDOVER COMMAND" message defined in accordance with a Radio Resource Control (RRC) protocol.

17. A mobile radio system comprising at least one mobile station, a radio access network and a core network, wherein the mobile station comprises means for taking into account, in a negotiation which enables a determination of characteristics of components of a session for a multimedia call, of information received by said mobile station regarding capacities of the radio access network, at least in its server cell, and wherein a re-performing of the negotiation is avoided if an allocating of resources fails due to lack of capacities of said server radio access network.

18. A mobile radio network equipment for a cellular mobile radio communication system comprising at least one mobile station, a radio access network, a core network and a means for performing a negotiation, said equipment comprising:
- means for informing at least one of the parties to a multimedia call of capacities of the radio access network of said party, at least in its server cell, for the negotiation enabling determination characteristics of components of the session for said multimedia call, for the control of the session, and
- wherein re-performing of the negotiation is avoided if an allocating of resources fails due to lack of capacities of said server radio access network.

19. A mobile station for a cellular mobile radio communication system comprising a radio access network and a core network, said mobile station comprising:
- means for receiving information regarding capacities of the radio access network, at least in a server cell of the mobile station; and
- means for taking into account, in a negotiation enabling determination of characteristics of components of the session for said multimedia call, of the information received by said mobile station regarding the capacities of the radio access network, at least in the server cell of the mobile station, and
- wherein re-performing of the negotiation is avoided if an allocating of resources fails due to lack of capacities of said server radio access network.

* * * * *